United States Patent
Lee

(10) Patent No.: US 11,605,378 B2
(45) Date of Patent: Mar. 14, 2023

(54) INTELLIGENT GATEWAY DEVICE AND SYSTEM INCLUDING THE SAME

(71) Applicant: LG ELECTRONICS INC., Seoul (KR)

(72) Inventor: Heungkyu Lee, Seoul (KR)

(*) Notice: Subject to any disclaimer, the term of this patent is extended or adjusted under 35 U.S.C. 154(b) by 609 days.

(21) Appl. No.: 16/498,318

(22) PCT Filed: Jul. 1, 2019

(86) PCT No.: PCT/KR2019/007985
§ 371 (c)(1),
(2) Date: Sep. 26, 2019

(87) PCT Pub. No.: WO2021/002493
PCT Pub. Date: Jan. 7, 2021

(65) Prior Publication Data
US 2021/0335355 A1    Oct. 28, 2021

(51) Int. Cl.
*G10L 15/22*    (2006.01)
*G10L 15/26*    (2006.01)
(Continued)

(52) U.S. Cl.
CPC .............. *G10L 15/22* (2013.01); *G10L 15/26* (2013.01); *G10L 15/30* (2013.01); *H04L 12/281* (2013.01)

(58) Field of Classification Search
CPC ......... G10L 15/22; G10L 15/26; G10L 15/30; H04L 12/281
See application file for complete search history.

(56) References Cited

U.S. PATENT DOCUMENTS 5,247,580 A * 9/1993 Kimura ................ H04B 10/114
704/E15.045
5,983,186 A * 11/1999 Miyazawa .............. G10L 15/26
704/E15.045
(Continued)

FOREIGN PATENT DOCUMENTS

CN    1758617 A  *  4/2006  ......... H04L 12/2803
CN   105374354 A  *  3/2016  ............ G08C 23/04
(Continued)

OTHER PUBLICATIONS

PCT International Application No. PCT/KR2019/007985, Written Opinion of the International Searching Authority dated Mar. 31, 2020, 10 pages.

*Primary Examiner* — Daniel C Washburn
*Assistant Examiner* — Oluwadamilola M Ogunbiyi
(74) *Attorney, Agent, or Firm* — Lee, Hong, Degerman, Kang & Waimey PC

(57) ABSTRACT

An intelligent gateway device according to an embodiment of the present invention includes: a communication unit configured to be connected with a plurality of recognition devices; and a processor configured to receive data including a user request from an electronic device, acquire characteristic information for the user request from the received data, select at least one recognition device from the plurality of recognition devices on the basis of the acquired characteristic information, transmit the data to a first recognition device of the selected at least one recognition device, receive a recognition result of the user request from any one recognition device of the at least one recognition device, and transmit the received recognition result to an control device connected with a control target electronic device.

25 Claims, 11 Drawing Sheets

(51) Int. Cl.
  *G10L 15/30* (2013.01)
  *H04L 12/28* (2006.01)

(56) References Cited

U.S. PATENT DOCUMENTS

| | | | | |
|---|---|---|---|---|
| 6,581,033 | B1 * | 6/2003 | Reynar | G10L 15/22 |
| | | | | 704/E15.04 |
| 7,092,870 | B1 * | 8/2006 | Chen | G06F 16/313 |
| | | | | 707/E17.084 |
| 9,978,260 | B2 * | 5/2018 | Lee | G08C 17/02 |
| 10,120,564 | B2 * | 11/2018 | Shim | G06F 3/04883 |
| 10,529,324 | B1 * | 1/2020 | Chopra | G10L 21/0208 |
| 10,672,379 | B1 * | 6/2020 | Ellert | G06F 3/162 |
| 11,380,325 | B2 * | 7/2022 | Kurihara | B60R 25/31 |
| 2007/0043868 | A1 * | 2/2007 | Kumar | G10L 15/26 |
| | | | | 703/12 |
| 2007/0133518 | A1 | 6/2007 | Ben-David et al. | |
| 2010/0318358 | A1 * | 12/2010 | Onishi | G10L 15/08 |
| | | | | 704/E15.04 |
| 2012/0022871 | A1 * | 1/2012 | Catchpole | G10L 15/34 |
| | | | | 704/E15.001 |
| 2013/0218572 | A1 * | 8/2013 | Cho | G10L 15/22 |
| | | | | 704/E21.001 |
| 2014/0129006 | A1 * | 5/2014 | Chen | G05B 15/02 |
| | | | | 700/90 |
| 2014/0249817 | A1 * | 9/2014 | Hart | G06F 3/167 |
| | | | | 704/254 |
| 2014/0288932 | A1 | 9/2014 | Yeracaris et al. | |
| 2015/0019214 | A1 * | 1/2015 | Wang | G06N 3/02 |
| | | | | 704/232 |
| 2015/0142447 | A1 * | 5/2015 | Kennewick | G10L 15/24 |
| | | | | 704/275 |
| 2015/0243287 | A1 | 8/2015 | Nakano et al. | |
| 2016/0210115 | A1 * | 7/2016 | Lee | G06F 3/167 |
| 2016/0275076 | A1 * | 9/2016 | Ishikawa | G06F 40/58 |
| 2016/0320849 | A1 * | 11/2016 | Koo | G06F 3/04847 |
| 2017/0345424 | A1 * | 11/2017 | Ikeno | G10L 25/63 |
| 2018/0096678 | A1 * | 4/2018 | Zhou | G10L 15/22 |
| 2018/0102127 | A1 * | 4/2018 | Izawa | G10L 15/30 |
| 2018/0211665 | A1 * | 7/2018 | Park | G10L 15/32 |
| 2018/0240456 | A1 | 8/2018 | Jeong | |
| 2018/0240460 | A1 | 8/2018 | Matsumoto et al. | |
| 2018/0275708 | A1 * | 9/2018 | Forbes, Jr. | H02J 13/00028 |
| 2018/0336883 | A1 * | 11/2018 | Li | G10L 15/02 |
| 2018/0350363 | A1 * | 12/2018 | Cook | G06F 3/165 |
| 2018/0366097 | A1 * | 12/2018 | Sharp | G10L 15/22 |
| 2019/0139537 | A1 * | 5/2019 | Akamine | G10L 15/1815 |
| 2019/0180770 | A1 * | 6/2019 | Kothari | G10L 25/60 |
| 2019/0215673 | A1 * | 7/2019 | Choi | H04L 47/20 |
| 2019/0215879 | A1 * | 7/2019 | Song | G10L 15/22 |
| 2019/0281935 | A1 * | 9/2019 | Gharabegian | G05B 15/02 |
| 2019/0304469 | A1 * | 10/2019 | Chen | G10L 17/02 |
| 2019/0371318 | A1 * | 12/2019 | Shukla | G10L 15/22 |
| 2020/0005793 | A1 * | 1/2020 | Wu | G10L 15/22 |
| 2020/0035235 | A1 * | 1/2020 | Lee | G10L 15/1815 |
| 2020/0058292 | A1 * | 2/2020 | Maeda | G06F 16/252 |
| 2020/0058300 | A1 * | 2/2020 | Kumar | G10L 13/00 |
| 2020/0066254 | A1 * | 2/2020 | Hiroe | H04W 4/00 |
| 2020/0068685 | A1 * | 2/2020 | DiFelice | F21V 33/0056 |
| 2020/0117156 | A1 * | 4/2020 | Guan | H04L 12/2834 |
| 2020/0152189 | A1 * | 5/2020 | Kuo | G10L 17/24 |
| 2020/0349932 | A1 * | 11/2020 | Ogawa | G06F 3/167 |
| 2020/0372911 | A1 * | 11/2020 | Seo | G10L 25/51 |
| 2020/0388284 | A1 * | 12/2020 | Candelore | H04N 21/440236 |
| 2021/0183397 | A1 * | 6/2021 | Liu | G06F 9/44505 |
| 2021/0232776 | A1 * | 7/2021 | Kim | G06F 40/35 |
| 2022/0035551 | A1 * | 2/2022 | Iyer | G06F 3/0653 |

FOREIGN PATENT DOCUMENTS

| | | | | |
|---|---|---|---|---|
| DE | 102017114145 | A1 * | 1/2018 | G10L 15/01 |
| JP | 2015018238 | | 1/2015 | |
| JP | 6375521 | B2 * | 8/2018 | G06F 16/00 |
| JP | 2018136493 | | 8/2018 | |
| JP | 2018190436 | | 11/2018 | |
| KR | 1020180096183 | | 8/2018 | |
| KR | 20200052638 | A * | 5/2020 | G10L 15/22 |
| WO | WO-2016110068 | A1 * | 7/2016 | G10L 15/22 |

* cited by examiner

INTELLIGENT GATEWAY DEVICE AND SYSTEM INCLUDING THE SAME

CROSS-REFERENCE TO RELATED APPLICATIONS

This application is the National Stage filing under 35 U.S.C. 371 of International Application No. PCT/KR2019/007985, filed on Jul. 1, 2019, the contents of which are hereby incorporated by reference herein its entirety.

FIELD

The present invention relates to an intelligent gateway device and a control system including the intelligent gateway device.

BACKGROUND

Recently, as the artificial intelligence has been developed, the types of requests or instructions that users can input through electronic devices have been varied. In particular, it becomes possible to input requests or instructions having the types of a voice, an image, etc. through electronic device beyond the manner of inputting the requests or instructions through physical or virtual buttons.

Such a voice or image type of request can be recognized by an electronic device itself or by a separate recognition device connected with an electronic device. Recently, various companies that provide recognition solutions using the recognition device have appeared.

In this case, a gateway device is implemented between the electronic device and the recognition device, so it is possible to process requests transmitted from several electronic devices on the basis of the loads of the gateway device and the recognition device.

Meanwhile, requests that are transmitted from an electronic device in the related art are generally limited to requests related to control of the electronic device. In this case, the gateway device is connected with a recognition device that can recognize requests related to control of the electronic device and all of requests transmitted from the electronic device can be recognized by the connected recognition device.

However, recently, the kinds of requests that are input through the electronic device are being varied due to development of the artificial intelligence technology, and in this case, it may be difficult to all the various requests through any one recognition device.

SUMMARY

An object of the present invention is to provide an intelligent gateway device that makes it possible to more accurately recognize various kinds of user requests that are transmitted from an electronic device.

Another object of the present invention is to provide an intelligent gateway device that makes it possible to effectively recognize user requests having various characteristics.

An intelligent gateway device according to an embodiment of the present invention includes: a communication unit configured to be connected with a plurality of recognition devices; and a processor configured to receive data including a user request from an electronic device, acquire characteristic information for the user request from the received data, select at least one recognition device from the plurality of recognition devices on the basis of the acquired characteristic information, transmit the data to a first recognition device of the selected at least one recognition device, receive a recognition result of the user request from any one recognition device of the at least one recognition device, and transmit the received recognition result to an control device connected with a control target electronic device.

Depending on embodiments, the user request may have any one data type of a voice, a text, or an image.

Depending on embodiments, the characteristic information may include language information of the user request, the data type, and property information showing whether to control an electronic device.

Depending on embodiments, the data type of the user request may correspond to a voice, and the processor may select the first recognition device, which is capable of converting a voice of a language corresponding to the language information into a text, from the plurality of recognition devices.

Depending on embodiments, the processor may transmit the data to an ASR device included in the first recognition device.

Depending on embodiments, the processor may select the any one recognition device, which is capable of recognizing a user request corresponding to the property information, from the plurality of recognition devices.

Depending on embodiments, the processor may receive the recognition result from an NLP device included in the any one recognition device.

Depending on embodiments, when the property information of the user request corresponds to a request to provide predetermined information, the intelligent gateway device may transmit the received recognition result to a TTS device included in the first recognition device, receive voice data corresponding to the recognition result from the first recognition device, and transmit the received voice data to the electronic device.

The processor may convert a protocol of the received data to correspond to a protocol of the first recognition device and transmits the converted data to the first recognition device.

The electronic device and the control target electronic device may be the same or different from each other.

Depending on embodiments, the recognition result may be associated with a control command of the control target electronic device, and the processor may receive a control result based on the control command from the control target electronic device through the control device, transmit the received control result to any one recognition device of the plurality of recognition devices, receive voice data corresponding to the control result from the any one recognition device, and transmit the received voice data to the electronic device.

A control system according to an embodiment of the present invention includes: an intelligent gateway device configured to receive data including a user request from a first electronic device, acquire characteristic information for the user request from the received data, select at least one recognition device from a plurality of recognition devices on the basis of the acquired characteristic information, transmit the data to a first recognition device of the selected at least one recognition device, and receive a recognition result of the user request from any one recognition device of the at least one recognition device; and a control device configured to receive the recognition result from the intelligent gateway device, generate a control command or output data corresponding to the received recognition result, and transmit the generated control command or output data to a second electronic device that is the same as or different from the first electronic device.

DETAILED DESCRIPTION

Figure 1:
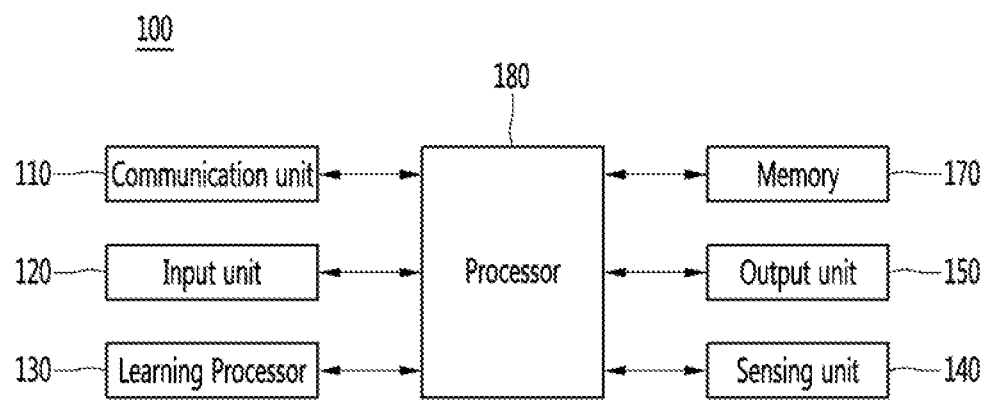
FIG. 1 shows an AI device according to an embodiment of the present invention.

Hereafter, embodiments of the present invention will be described in detail with reference to the accompanying drawings and the same or similar components are given the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to the present invention makes the subject matter of the embodiments described herein unclear, the detailed description is omitted. The accompanying drawings are provided only for helping easily understand the embodiments described herein without limiting the technological spirit of the present invention and should be construed as including all modifications, equivalents, and replacements that are included in the spirit and scope of the present invention.

Terms including ordinal numbers such as 'first', 'second', etc., may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
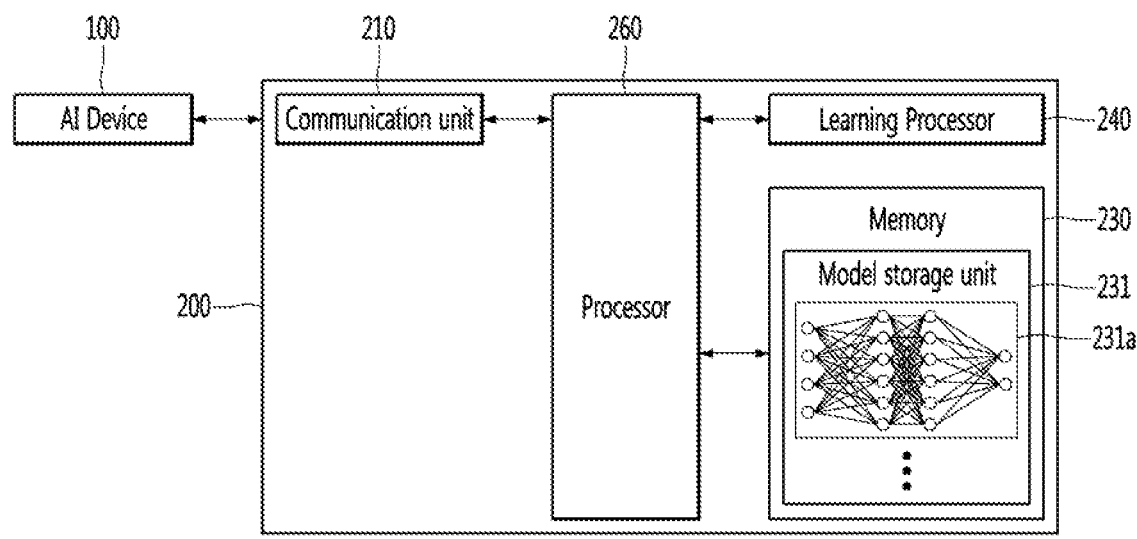
FIG. 2 shows an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
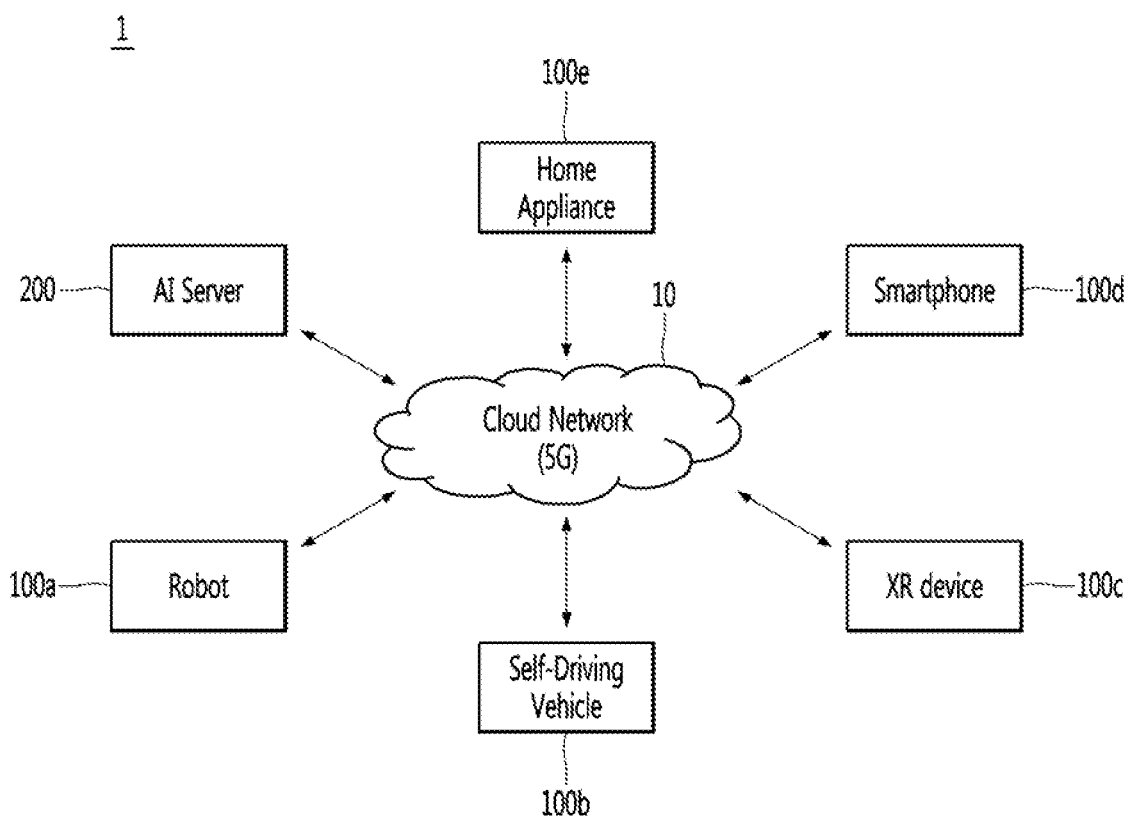
FIG. 3 shows an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
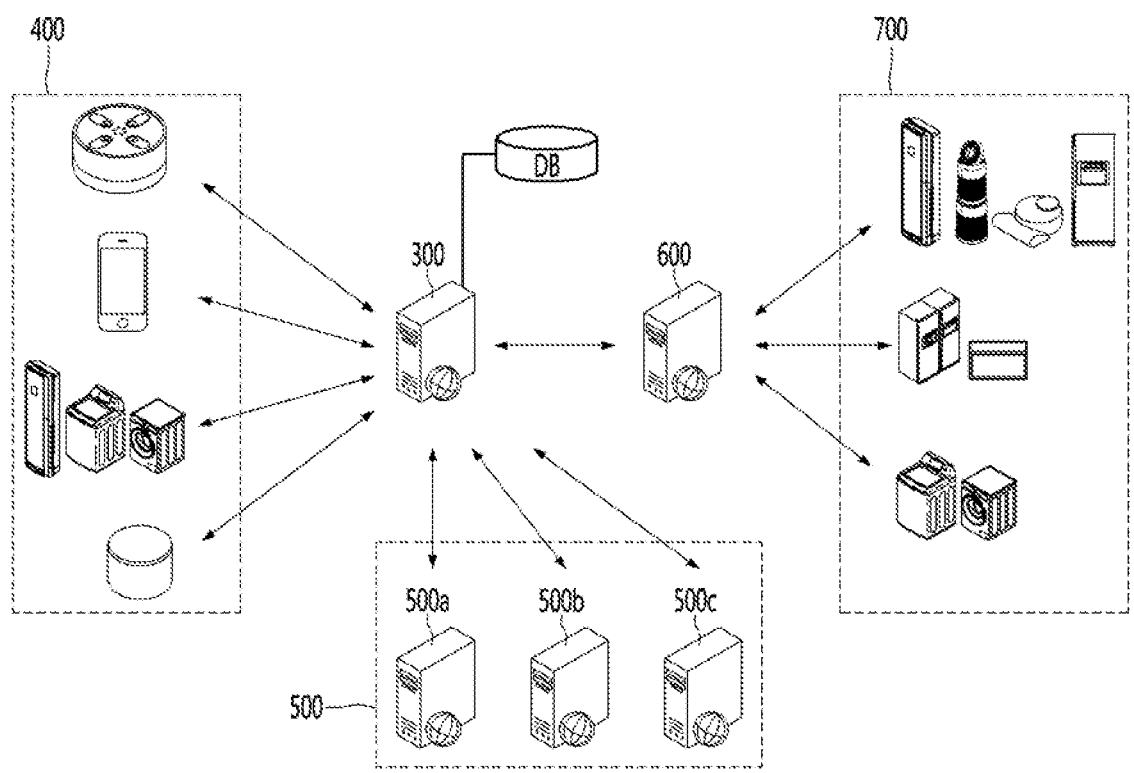
FIG. 4 is a conceptual diagram of an intelligent gateway device according to an embodiment of the present invention and a control system including the intelligent gateway device.

FIG. 4 is a conceptual diagram of an intelligent gateway device according to an embodiment of the present invention and a control system including the intelligent gateway device.

Referring to FIG. 4, a control system may include an intelligent gateway device 300 and a control device 600.

The intelligent gateway device 300 is connected with at least one electronic device 400, so it can receive data including a user request from the electronic device 400.

The electronic device 400 may include various kinds of electronic devices that can acquire the user request from a user. For example, the electronic device 400 may include a mobile terminal (a smartphone, a tablet PC, etc.), a home appliance (an air conditioner, a washing machine, a refrigerator, etc.), a voice input/output device (an artificial intelligence speaker, etc.), etc.

Depending on embodiments, the electronic device 400 may correspond to the AI device 100 described in detail with reference to FIG. 1.

The user request may include a request related to the operation or the function of the electronic device 400, but is not limited thereto and may include various kinds of requests such as a request to provide specific information or a dialogue.

The user request can be input in various types such as a voice, a text, and an image. To this end, the electronic device 400 may include an input unit such as microphone, a camera, and/or a text input unit (a button, a keypad, a touch screen, etc.).

The electronic device 400 can transmit data including the acquired user request to the intelligent gateway device 300. The data can be transmitted in a packet type and the header of the packet may include characteristic information related to the user request.

For example, the characteristic information may include the language of the user request (Korean, English, etc.), a data type (a voice, a text, an image, etc.), the property of the request (a control request of an electronic device, a request to provide information, etc.), etc. For example, the electronic device 400 can acquire the language information on the basis of the language currently set in the electronic device 400, can acquire the data type information on the basis of the input unit that acquired the user request, and can acquire the property information on the basis of an operation or a function that is being performed when acquiring the user request.

Meanwhile, the electronic device 400 can generate and transmit data including the user request in accordance with a protocol defined between the electronic device 400 and the intelligent gateway device 300. For example, the protocol may be a web socket protocol, but is not limited thereto.

Further, the electronic device 400 can encode the data in accordance with (Transport Layer Security) and then can transmit the encoded data to the intelligent gateway device 300.

The intelligent gateway device 300 makes a recognition device 500 recognize the user request included in the data received from the connected electronic device 400 by transmitting the data to the recognition device 500.

In particular, the intelligent gateway device 300 according to an embodiment of the present invention may be connected with a plurality of recognition devices 500a, 500b, and 500c that provides different recognition solutions. In this case, the intelligent gateway device 300 can select at least one recognition device that can recognize the user request on the basis of the characteristic information of the user request included in the received data.

For example, on the basis of language information of the user request, the intelligent gateway device 300 can select a recognition device, which can recognize the language corresponding to the language information, and can transmit the data to the selected recognition device.

For example, on the basis of data type information of the user request, the intelligent gateway device 300 can select a recognition device, which can recognize the data type of user request, and can transmit the data to the selected recognition device.

Meanwhile, when transmitting the data to the selected recognition device, the intelligent gateway device 300 may convert the data in accordance with a protocol between the intelligent gateway device 300 and the selected recognition device. For example, when the protocol between the intelligent gateway device 300 and the selected recognition device corresponds to TCP/IP, the intelligent gateway device 300 can convert the received data to correspond to a TCP/IP protocol and can transmit the converted data to the selected recognition device.

Meanwhile, the intelligent gateway device 300 can process in parallel a plurality of data received from a plurality of electronic devices 400. That is, the intelligent gateway device 300 can be configured to process in parallel the user requests from a plurality of simultaneous visitors.

Depending on embodiments, the intelligent gateway device 300 may store received data and log data including a transaction history for the data with a recognition device 500 into a database. A manager of the intelligent gateway device 300 can acquire various items of statistical information or perform improvement work of the intelligent gateway device 300 through the data accumulatively stored in the database.

The recognition device 500 can recognize a user request included in data received from the intelligent gateway device 300 and can transmit the recognition result to the intelligent gateway device 300.

The recognition device 500 may be implemented as a device for recognizing various data types of user requests such as a voice recognition device, an image recognition device, or a text recognition device.

The intelligent gateway device 300 can transmit the received recognition result to the control device 600.

The control device 600 can acquire a control command or output data corresponding to the recognition result received from the intelligent gateway device 300. The control device 600 transmits the acquired control command or output data to a control target electronic device 700, whereby the user request can be finally processed.

The control target electronic device 700 may be an electronic device the same as or different from the electronic device 400 that acquires a user request. For example, the control target electronic device 700 may include the home appliance, the mobile terminal, and/or the voice input/output device described above.

Meanwhile, the control device 600 may be implemented as the AI server 200 described with reference to FIG. 2. In this case, the control device 600 may acquire a control command or output data from the recognition result received from the intelligent gateway device 300 through the learning model (artificial neural network, etc.)

Figure 5:
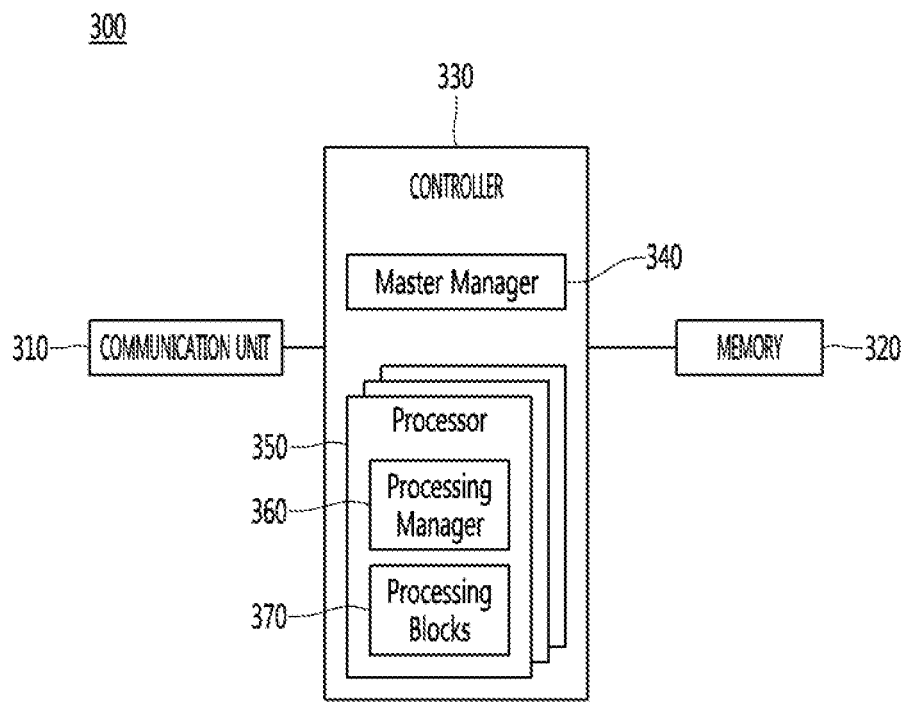
FIG. 5 is a schematic block diagram of the intelligent gateway device shown in FIG. 4.

FIG. 5 is a schematic block diagram of the intelligent gateway device shown in FIG. 4.

Referring to FIG. 5, the intelligent gateway device 300 may include a communication unit 310, a memory 320, and a controller 330.

The communication unit 310 may include at least one communication module for connecting the intelligent gateway device 300 with the electronic devices 400 and 700, the recognition device 500, and the control device 600. For example, each of the communication modules can support any one of various wire/wireless communication types known in the art.

The memory 320 can store various items of information, data, algorithms, etc. related to the operation of the intelligent gateway device 300.

For example, the memory 320 can store program data or algorithms for acquiring characteristic information for a user request from the packet header of data received from the electronic device 400.

Further, the memory 320 can store information or an algorithm for selecting at least one recognition device from a plurality of recognition devices on the basis of the acquired characteristic information.

Further, the memory 320 can store an algorithm for controlling the protocol of the received data into a protocol corresponding to the selected recognition device.

Further, the memory 320 can store information, data, and algorithms related to the operation of the intelligent gateway device 300 according to the embodiment shown in FIGS. 6 to 12 to be described below.

Depending on embodiments, the database described with reference to FIG. 4 may be included in the memory 320. Alternatively, the database may be a separate database that is connected with the intelligent gateway device 300.

Hardware-wise, the memory 320 may include various storage devices such as a ROM, a RAM, an EPROM, a flash drive, and a hard drive.

The controller 330 can control all operations of the intelligent gateway device 300. The controller 330 may include at least one processor 350 (core).

In particular, the controller 330 according to an embodiment of the present invention may be configured to process in parallel data (a plurality of data) including a user request received from each of a plurality of electronic devices. In relation to this, the controller 330 may include a master manager 340 and at least one processor 350, and each of the processors 350 may include a processing manager 360 and a plurality of processing blocks 370.

The plurality of processing blocks 370 each may process any one datum. That is, the controller 330 can process in parallel data corresponding to the number of the processing blocks 370.

The master manager 340 can allocate each of a plurality of data received from the electronic devices 400 to any one processor 350. Depending on embodiments, when all of the processors 350 included in the controller 330 are being used, the master manager 340 can request standby by informing the electronic device 400 of a excessive load state (or a busy state) of the intelligent gateway device 300.

When predetermined data are allocated to the processor 350 by the master manager 340, the processing manager 360 can allocate the data to any one processing block of the plurality of processing blocks 370 included in the processor 350.

The processing block can process the allocated data. As described above, the processing block can acquire characteristic information of a user request from the packet header of the allocated data and can select a recognition device to recognize the user request on the basis of the acquired characteristic information.

The processing block can convert the data on the basis of the protocol of the selected recognition device and can control the communication unit 310 to transmit the converted data to the selected recognition device.

Further, the processing block can receive a recognition result of the user request from the selected recognition device and can transmit the received recognition result to the control device 600 connected with the intelligent gateway device 300.

That is, the intelligent gateway device 300 can process in parallel a plurality of data corresponding to the processing blocks 370 included in the controller 330.

Hereafter, the operations of the intelligent gateway device 300 according to an embodiment of the present invention and a control system including the intelligent gateway device 300 are described in detail with reference to FIGS. 6 to 12.

Figure 6:
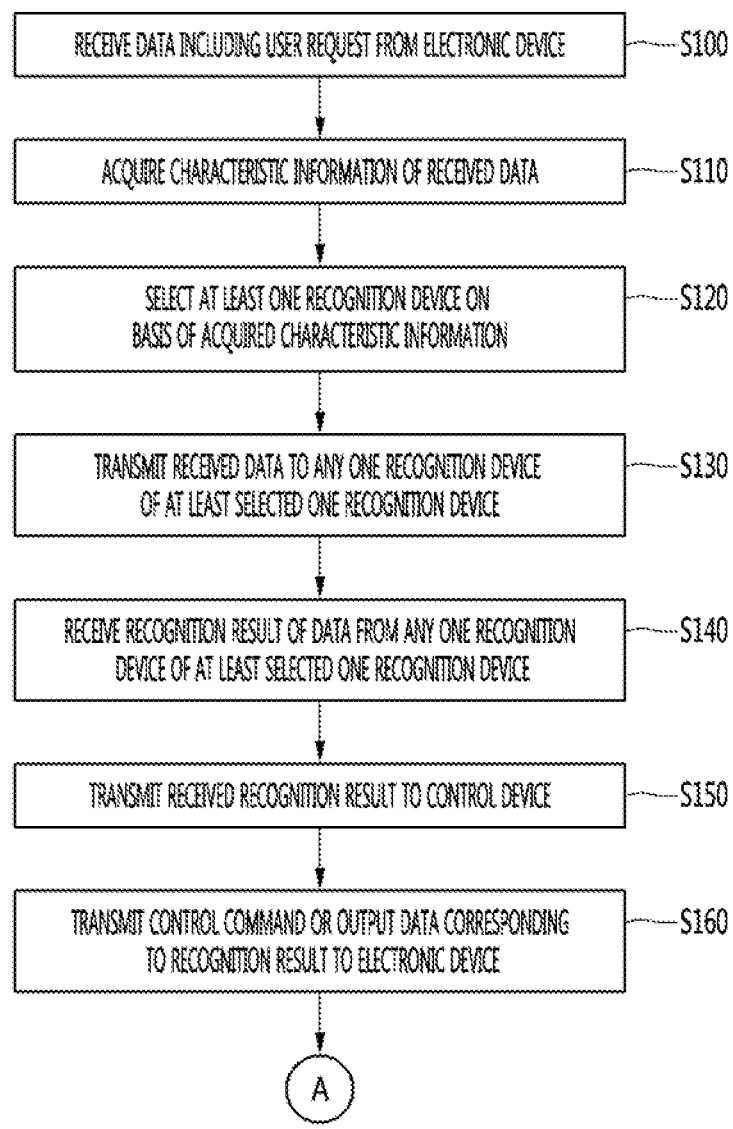
FIGS. 6 to 7 are flowcharts illustrating the operations of an intelligent gateway device according to an embodiment of the present invention and a control system including the intelligent gateway device.
Figure 7:
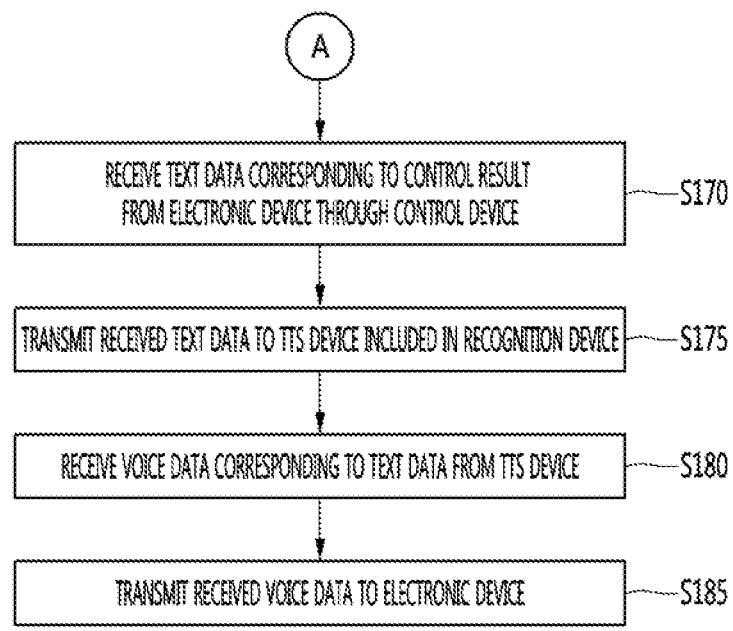
Figure 8:
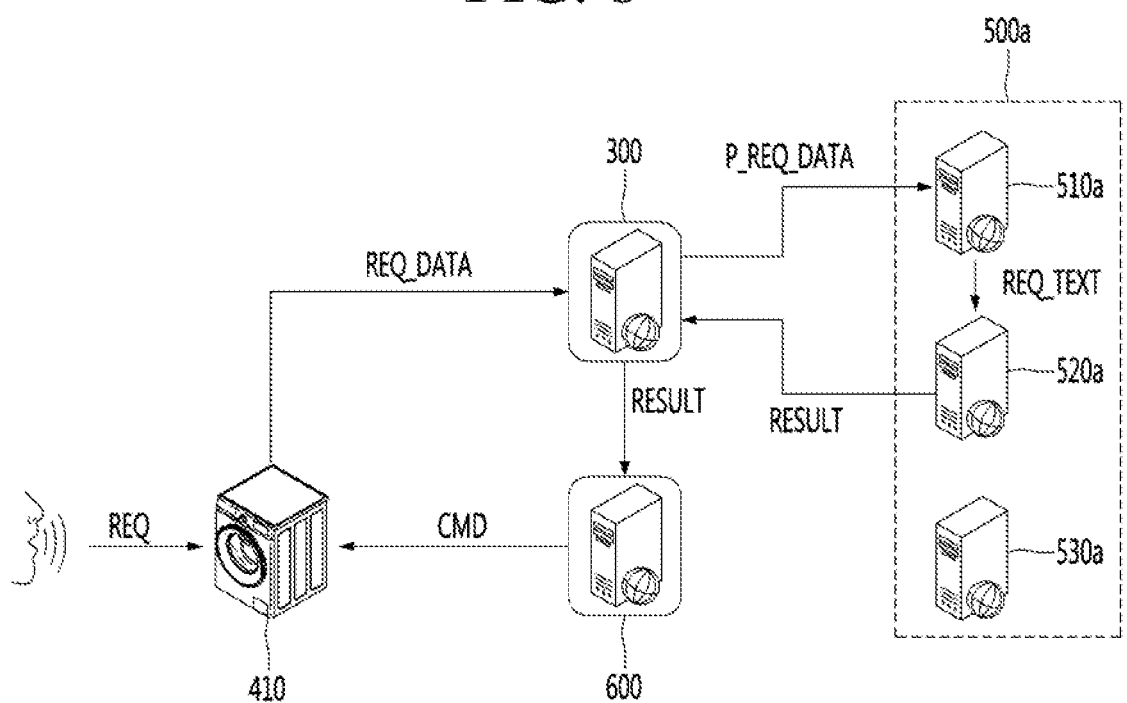
FIGS. 8 to 9 are exemplary diagrams showing data transmission flow related to the operations of the intelligent gateway device and the control system shown in FIGS. 6 to 7.
Figure 9:
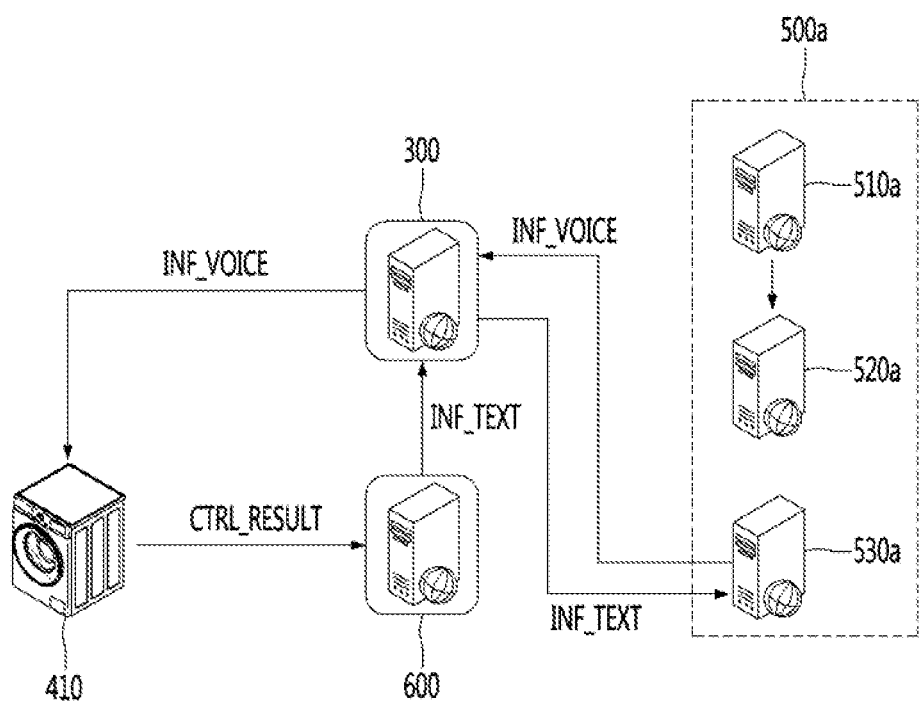

FIGS. 6 to 7 are flowcharts illustrating the operations of an intelligent gateway device according to an embodiment of the present invention and a control system including the intelligent gateway device. FIGS. 8 to 9 are exemplary diagrams showing data transmission flow related to the intelligent gateway device and the control system shown in FIGS. 6 to 7.

Hereafter, the operations of the intelligent gateway device 300 and the control system are described through an embodiment in which a user request is input in a voice type in the specification. However, the user request can be input in various types such as a text and an image, in addition to a voice.

Referring to FIGS. 6 to 9, the intelligent gateway device 300 can receive data including a user request from the electronic device 400 (S100).

A user can input the user request REQ through an input unit of the electronic device (e.g., a washing machine 410). For example, a user can utter a voice corresponding to the user request REQ and the electronic device 410 can acquire the user request REQ through a microphone.

The electronic device 410 can generate data REQ_DATA including the received user request REQ and can transmit the generated data REQ_DATA to the intelligent gateway device 300. For example, the electronic device 410 can generate data REQ_DATA including a packet header, which includes information related to the user request REQ, the electronic device, and the user, and the user request REQ. As described above, information showing a language (e.g., Korean), a data type (e.g., a voice), a property (e.g., a control command of the control target electronic device), etc. may be included in the packet header as characteristic information for the user request REQ. Depending on embodiments, information for identifying the electronic device 410 and/or the user may be further included in the packet header.

The intelligent gateway device 300 can acquire characteristic information of the received data (S110) and can select at least one recognition device to recognize the user request included in the data from a plurality of recognition devices on the basis of the acquired characteristic information (S120).

The processor 350 (or the processing block 370 included in the processor) can acquire characteristic information for the user request REQ from the packet header of the received data REQ_DATA. The processor 350 can select at least one recognition device (e.g., first recognition device 500a) to recognize the user request REQ from a plurality of recognition devices 500 connected with the intelligent gateway device 300 on the basis of the acquired characteristic information.

Since the user request REQ is a data type voice, the first recognition device 500a may correspond to a voice recognition device. In this case, the first recognition device 500a may include an ASR (automatic speech recognition) device 510a, an NLP (natural language processing) device 520a, and a TTS (text to speech) device 530a. The ASR device 510a, the NLP device 520a, and the TTS device 530a are shown as being configured as separate devices in FIG. 8, etc., but they may be integrally implemented in one device, depending on embodiments.

The ASR device 510a can convert a voice into a text, using a well-known automatic voice recognition technology. The ASR device 510a can transmit the converted text to the NLP device 520a or the intelligent gateway device 300.

The NLP device 520a can recognize the intention or the meaning corresponding to the converted text. For example, the NLP device 520a can recognize the meaning of the text from at least one keyword included in the text. The NLP device 520a can transmit the recognition result to the TTS device 530a or the intelligent gateway device 300.

The TTS device 530a can convert the text into a voice and can transmit data including the converted voice to the intelligent gateway device 300.

Depending on embodiments, when selecting a recognition device to recognize a user request REQ, the processor 350 may select some of devices included in the first recognition device 500a and some of devices included in a second recognition device 500b together. An embodiment related to this case will be described below with reference to FIGS. 10 and 12.

The intelligent gateway device 300 can transmit the received data to any one recognition device of at least one selected recognition device (S130). The intelligent gateway device 300 can receive a recognition result of the user request included in the data from any one recognition device of at least one selected recognition device (S140).

The processor 350 can select the first recognition device 500a on the basis of step S120. In this case, the protocol 350 can convert the protocol of data REQ_DATA on the basis of the protocol of the first recognition device 500a and can transmit conversion data P_REQ_DATA to the first recognition device 500a.

The ASR device 510a of the first recognition device 500a can convert the voice type of user request REQ included in the conversion data P_REQ_DATA into a text REQ_TEXT. The ASR device 510a can transmit the converted text REQ_TEXT to the NLP device 520a.

The NLP device 520a can recognize a meaning or an intention from the converted text REQ_TEXT and can transmit a recognition result RESULT to the intelligent gateway device 300. For example, the recognition result RESULT may include at least one keyword that is recognized from the text REQ_TEXT.

The intelligent gateway device 300 can transmit the received recognition result RESULT to the control device 600 (S150).

The control device 600 can acquire a control command CMD or output data corresponding to the recognition result and can transmit the acquired control command or output data to a control target electronic device (S160).

For example, when the recognition result RESUT includes a keyword related to control of a specific function or operation of the control target electronic device, the control device 600 can acquire a control command CMD for controlling the control target electronic device from the recognition result RESULT.

Depending on embodiments, when the recognition result RESULT includes a keyword that is not related to control of an electronic device such as a request to provide predetermined information (e.g., a request to provide weather information), the control device 600 may acquire output data to be output through the control target electronic device from the recognition result RESULT.

On the other hand, the control target electronic device may be the same as or different from the electronic device 410 that has received the user request REQ. For example, when the control target electronic device is the electronic device 410, the control device 600 can transmit the control command CMD or the output data to the electronic device 410.

The electronic device 410 can perform an operation corresponding to the received control command CMD or can output the received output data through an output unit (a display, a speaker, etc.).

Depending on embodiments, the control target electronic device 700 can transmit a control result CTRL_RESULT based on the received control command CMD to the control device 600. The intelligent gateway device 300 can receive text data INF_TEXT corresponding to the control result CTRL_RESULT from the control device 600 (S170).

For example, the control result CTRL_RESULT may correspond to a code or a signal pattern defined in advance. The control device 600 can acquire text data INF_TEXT showing the control result CTRL_RESULT from the code or the signal pattern of the received control result CTRL_RESULT. For example, the text data INF_TEXT may include an informing message for informing the user of the control result CTRL_RESULT.

The control device 600 can transmit the acquired text data INF_TEXT to the intelligent gateway device 300.

The intelligent gateway device 300 can transmit the received text data INF_TEXT to the TTS device 530a included in the recognition device 500a (S175) and can receive voice data INF_VOICE corresponding to the text data INF_TEXT from the TTS device 530a (S180).

The processor 350 can transmit the received text data INF_TEXT to the TTS device 530a included in a recognition device (e.g., the TTS device 530a included in the first recognition device 500a).

The TTS device 530a can convert the received text data INF_TEXT into voice data INF_VOICE and can transmit the converted voice data INF_VOICE to the intelligent gateway device 300.

The intelligent gateway device 300 can transmit the received voice data INF_VOICE to an electronic device (S185).

The electronic device 410 can provide information related to processing of the user request REQ to the user by outputting a voice type of informing message included in the received voice data through a speaker.

Figure 10:
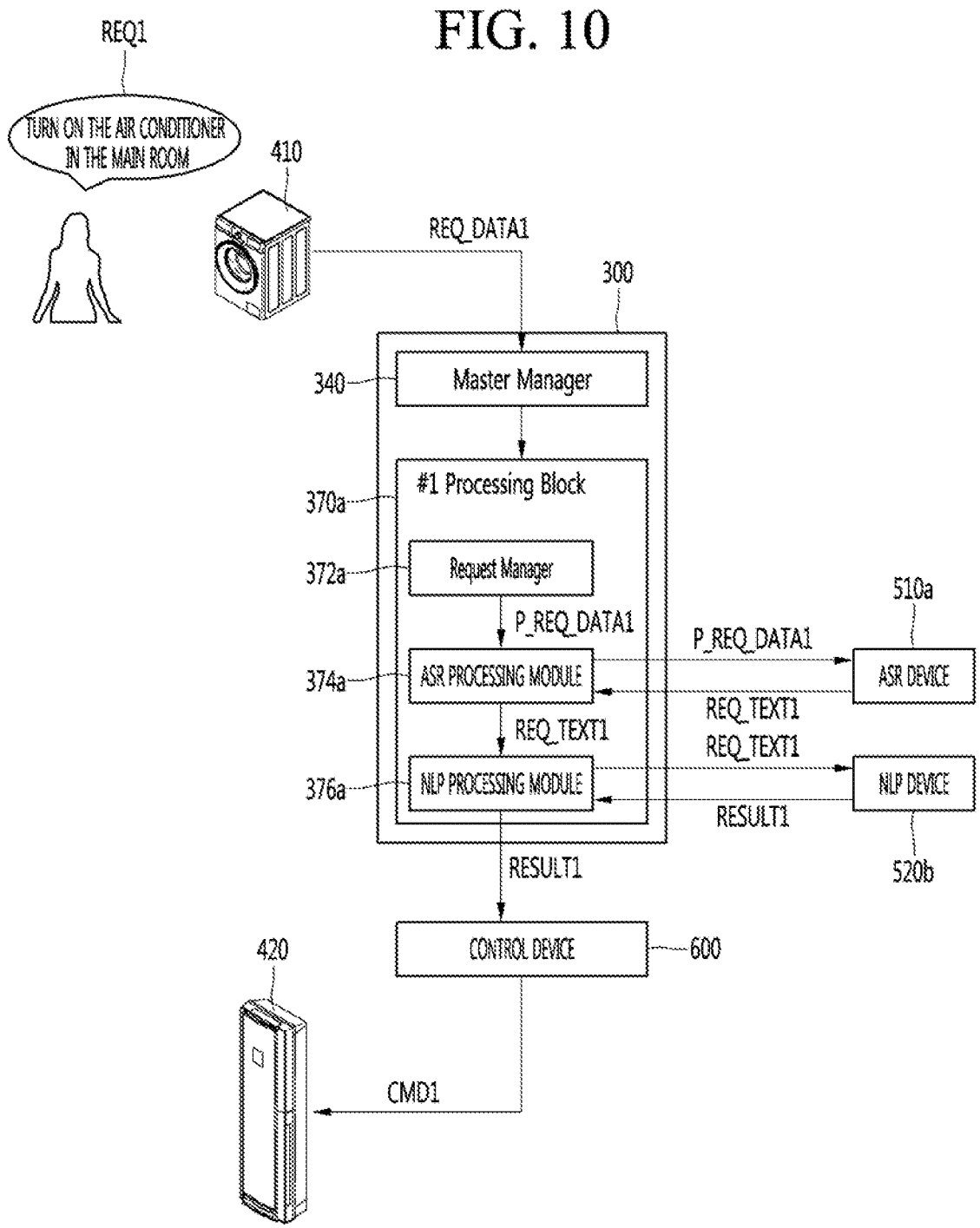
FIGS. 10 to 12 detailed examples related to the operations of the intelligent gateway device and the control system shown in FIGS. 6 to 7.
Figure 11:
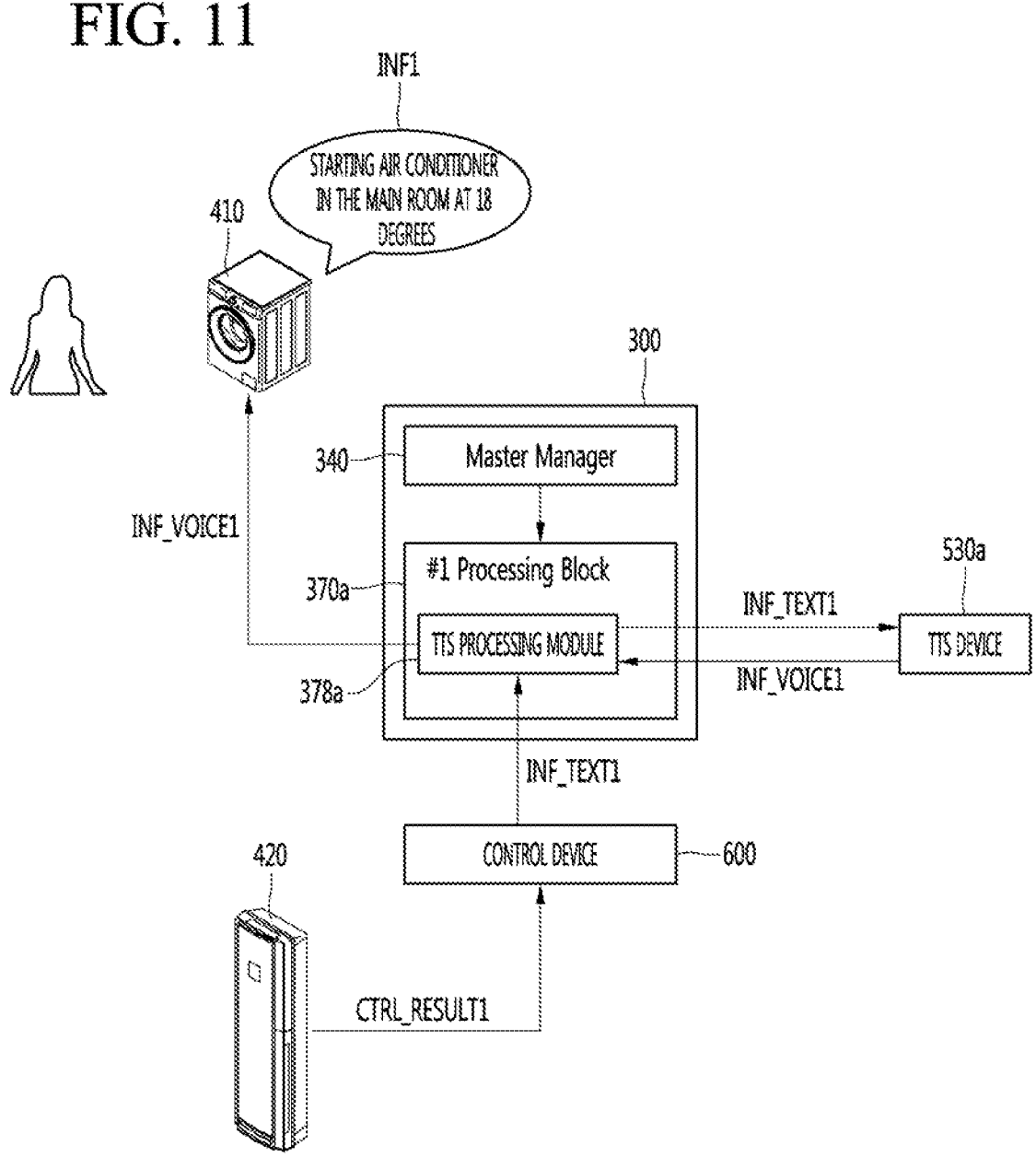
Figure 12:
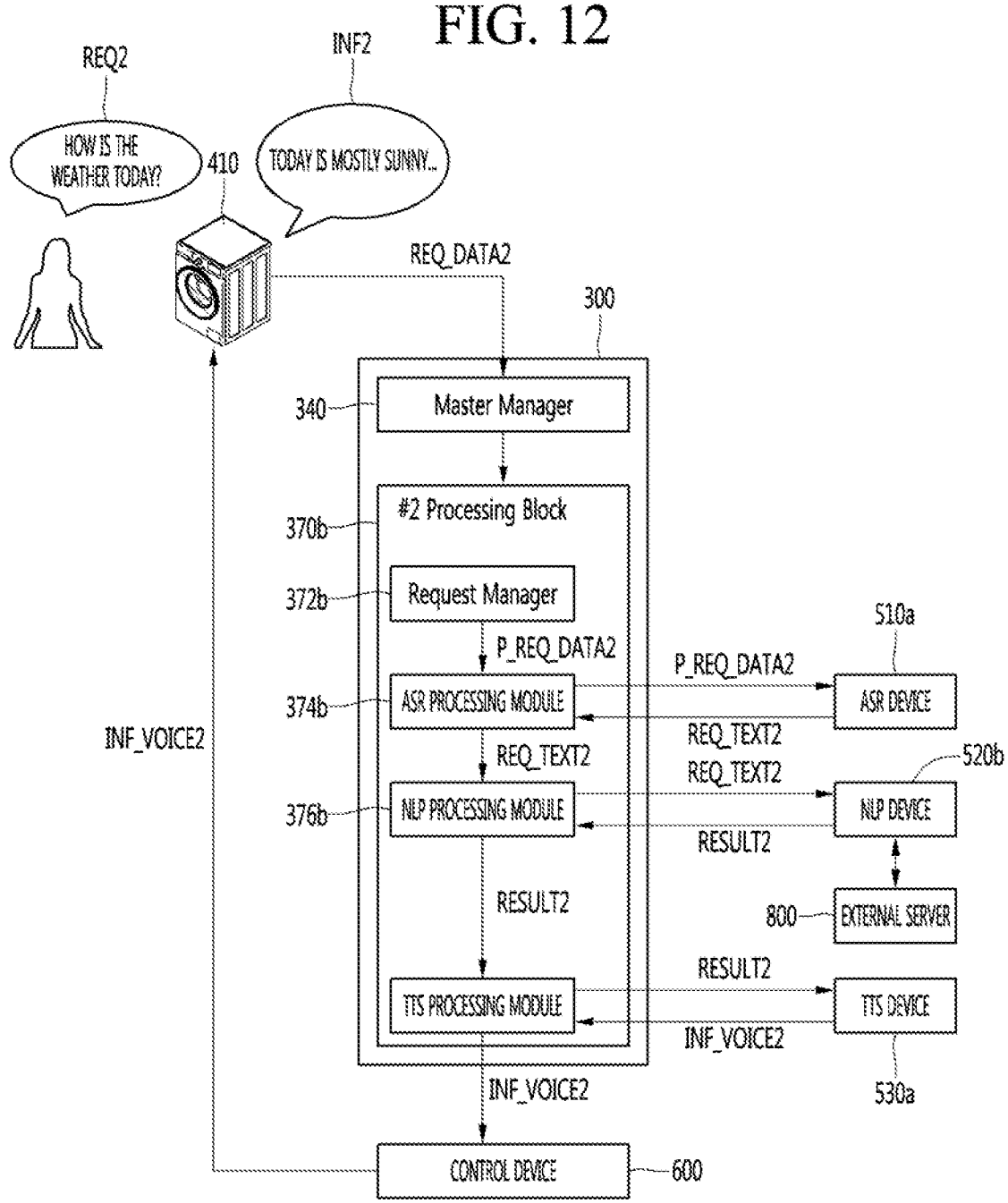

FIGS. 10 to 12 detailed examples related to the operations of the intelligent gateway device and the control system shown in FIGS. 6 to 7.

Referring to FIG. 10, a user can input a first user request REQ1 corresponding to "turn on the air conditioner in the main room" to a first electronic device 410 (e.g., a washing machine). For example, the first user request REQ1 can be input a voice type. The first user request REQ1 may be a control request for not the first electronic device 410, but a second electronic device 420.

The electronic device 410 can transmit first data REQ_DATA1 including the first user request REQ1 to the intelligent gateway device 300. As described above, characteristic information (language, data type, property, etc.) for the first user request REQ1 can be included in the packet header of the first data REQ_DATA1.

The master manager 340 and the processing manager 360 of the intelligent gateway device 300 can allocate the received first data REQ_DATA1 to a first processing block 370a of a plurality of processing blocks included in the controller 330.

A request manager 372a included in the first processing block 370a can acquire and analyze the characteristic information of the first user request REQ1 from the packet header of the first data REQ_DATA1.

Depending on embodiments, the request manager 372a included in the first processing block 370a may perform a user authentication operation on the basis of identification information of the user included in the first data REQ_DATA1. When the user is normally authenticated, the request manager 372a can acquire and analyze the characteristic information.

For example, the request manager 372a can recognize that the language information of the characteristic information corresponds to 'Korean', the data type corresponds to 'voice', and the property information corresponds to 'request to control an air conditioner'.

In this case, the request manager 372a of the first processing block 370a can select at least one recognition device of a plurality of recognition devices connected with the intelligent gateway device 300. For example, the request manager 372a can select the ASR device 510a of the first recognition deice 500a that can convert a Korean voice into a text, the TTS device 530a of the first recognition deice 500a that can convert a text into a Korean voice, and the NLP device 520b of the second recognition device 500b that can recognize a request to control an air conditioner.

Further, the request manager 372a can acquire conversion data P_REQ_DATA1 converted from the protocol of the first data REQ_DATA1 on the basis of the protocol of the selected ASR device 510a.

An ASR processing module 374a included in the first processing block 370a can transmit the acquired conversion data P_REQ_DATA1 to the ASR device 510a.

The ASR device 510a can convert the first user request REQ1 included in the received conversion data P_REQ_DATA1 into a first text REQ_TEXT1 and can transmit the converted first text REQ_TEXT1 to the intelligent gateway device 300.

The ASR processing module of the first processing block 370a can provide the received first text REQ_TEXT1 to an NLP processing module 376a and the NLP processing module 376a can transmit the first text REQ_TEXT1 to an NLP device 520b selected in advance.

The NLP device 520b can recognize the meaning or the intention of the received first text REQ_TEXT1 and can transmit a recognition result RESULT1 to the intelligent gateway device 300. As described above, the recognition result RESULT1 may include at least one keyword related to the first text REQ_TEXT1.

The intelligent gateway device 300 can transmit the recognition result RESULT1 to the control device 600. The control device 600 can acquire a first control command CMD1 based on the recognition result RESULT1 and can transmit the acquired first control command CMD1 to the second electronic device 420 (e.g., an air conditioner).

Referring to FIG. 11, the second electronic device 420 can process the received first control command CMD1. For example, the second electronic device 420 can process the first control command CMD1 by performing a cooling operation at a set temperature 18° C. in response to the first control command CMD1.

The second electronic device 420 can generate a control result CTRL_RESULT1 according to the first control command CMD1 and can transmit the generated control result CTRL_RESULT1 to the control device 600. For example, the control result CTRL_RESULT1 may include codes or keywords corresponding to '18° C.' and 'cooling operation'.

The control device 600 can acquire first text data INF_TEXT1 corresponding to the received control result CTRL_RESULT1 and can transmit the first text data INF_TEXT1 to the intelligent gateway device 300.

A TTS processing module 378a of the first processing block 370a can transmit the received first text data INF_TEXT1 to a TTS device 530a of the first recognition device 500a selected in advance. The TTS device 530a can convert the received first text data INF_TEXT1 into first voice data INF_VOICE1 and can transmit the converted first voice data INF_VOICE1 to the intelligent gateway device 300.

The processor 350 can transmit the received first voice data INF_VOICE1 to the first electronic device 410.

Depending on embodiments, the processor 350 may convert the protocol of the first voice data INF_VOICE1 received from the TTS device 530a to correspond to the protocol of the first electronic device 410.

The first electronic device 410 can output a first informing voice INF1 corresponding to "starting the air condition in the main room at 18 degrees" on the basis of the received first voice data INF_VOICE1.

Referring to FIG. 12, a user can input a voice type of second user request REQ2 corresponding to "How is the weather today?" to the first electronic device 410. That is, the second user request REQ2 may correspond to a request to provide characteristic information.

The first electronic device 410 can transmit second data REQ_DATA2 including the second user request REQ2 to the intelligent gateway device 300. Characteristic information (language, data type, property, etc.) for the second user request REQ2 can be included in the packet header of the second data REQ_DATA2.

The master manager 340 and the processing manager 360 of the intelligent gateway device 300 can allocate the received second data REQ_DATA2 to a second processing block 370b of a plurality of processing blocks included in the controller 330.

A request manager 372b included in the second processing block 370b can acquire and analyze the characteristic information of the second user request REQ2 from the packet header of the second data REQ_DATA2.

Depending on embodiments, the request manager 372b included in the second processing block 370b may perform a user authentication operation on the basis of identification information of the user included in the second data REQ_DATA2. When the user is normally authenticated, the request manager 372b can acquire and analyze the characteristic information.

For example, the request manager 372b can recognize that the language information of the characteristic information corresponds to 'Korean', the data type corresponds to 'voice', and the property information corresponds to 'request to provide information'.

In this case, the request manager 372b of the second processing block 370b can select at least one recognition device of a plurality of recognition devices connected with the intelligent gateway device 300. For example, the request manager 372b can select the ASR device 510a of the first recognition deice 500a that can convert a Korean voice into a text, the TTS device 530a of the first recognition deice 500a that can convert a text into a Korean voice, and the NLP device 520b of the second recognition device 500b that can recognize a request to provide information.

Further, the request manager 372b can acquire conversion data P_REQ_DATA2 converted from the protocol of the second data REQ_DATA2 on the basis of the protocol of the selected ASR device 510a.

An ASR processing module 374b included in the second processing block 370b can transmit the acquired conversion data P_REQ_DATA2 to the ASR device 510a.

The ASR device 510a can convert the second user request REQ2 included in the received conversion data P_REQ_DATA2 into a second text REQ_TEXT2 and can transmit the converted second text REQ_TEXT2 to the intelligent gateway device 300.

The ASR processing module 374b of the second processing block 370b can provide the received second text REQ_TEXT2 to an NLP processing module 376b and the NLP processing module 376b can transmit the second text REQ_TEXT2 to an NLP device 520b selected in advance.

The NLP device 520*b* can recognize that the meaning or the intention of the received second text REQ_TEXT2 is a request to provide weather information. On the basis of a recognition result, the NLP device 520*b* can acquire weather information from an external server 800 connected with the second recognition device 500*b* and can transmit a recognition result RESULT2 including the acquired weather information to the intelligent gateway device 300. In this case, the recognition result RESULT2 may include a text showing the weather information.

The TTS processing module can transmit the recognition result RESULT2 to the TTS device 530*a* selected in advance. The TTS device 530*a* can convert the text included in the recognition result RESULT2 into a voice and can transmit the converted second voice data INF_VOICE2 to the intelligent gateway device 300.

The intelligent gateway device 300 can transmit the received second voice data INF_VOICE2 to the control device 600 and the control device 600 can transmit the second voice data INF_VOICE2 to the electronic device 410. The electronic device 410 can provide information corresponding to the user request REQ2 by outputting a second voice INF2 included in the received second voice data INF_VOICE2.

That is, according to an embodiment of the present invention, the intelligent gateway device 300 and the control system including the intelligent gateway device 300 can improve the accuracy of recognizing a user request by selecting an optimal recognition device in accordance with the characteristic information of a user request received from an electronic device.

Further, the intelligent gateway device 300 and the control system including the intelligent gateway device 300 are connected with a plurality of recognition devices, thereby being able to effectively process user requests having various characteristics.

The above description merely explains the spirit of the present invention and the present invention may be changed and modified in various ways without departing from the spirit of the present invention by those skilled in the art.

Accordingly, the embodiments described herein are provided merely not to limit, but to explain the spirit of the present invention, and the spirit of the present invention is not limited by the embodiments.

The protective range of the present invention should be construed by the following claims and the scope and spirit of the invention should be construed as being included in the patent right of the present invention.

What is claimed is:

1. An intelligent gateway device comprising:
a transceiver configured to communicate with a plurality of recognition devices; and
a controller including a master manager and a plurality of processors, wherein the master manager is configured to:
receive data including a user request from an electronic device, and
allocate the data to any one processor of the plurality of processors, wherein the any one processor is configured to:
receive the data from the master manager,
acquire characteristic information for the user request from the received data,
select at least one recognition device from the plurality of recognition devices based on the acquired characteristic information,
transmit the data to a first recognition device of the selected at least one recognition device,
receive a recognition result of the user request from any one recognition device of the at least one recognition device, and
transmit the received recognition result to a control device for controlling the control device.

2. The intelligent gateway device of claim 1, wherein the user request has any one of a data type of a voice, a text, or an image.

3. The intelligent gateway device of claim 2, wherein the characteristic information includes language information of the user request, the data type, and property information showing whether to control an electronic device.

4. The intelligent gateway device of claim 3, wherein the data type of the user request corresponds to a voice, and
the processor is further configured to select the first recognition device from the plurality of recognition devices, wherein the first recognition device is capable of converting a voice of a language corresponding to the language information into a text.

5. The intelligent gateway device of claim 4, wherein the processor is further configured to transmit the data to an automatic speech recognition (ASR) device included in the first recognition device.

6. The intelligent gateway device of claim 4, wherein the processor is further configured to select the any one recognition device from the plurality of recognition devices, wherein the any one recognition device is capable of recognizing a user request corresponding to the property information.

7. The intelligent gateway device of claim 6, wherein the processor is further configured to receive the recognition result from a natural language processing (NLP) device included in the any one recognition device.

8. The intelligent gateway device of claim 7, wherein when the property information of the user request corresponds to a request to provide predetermined information, the processor is further configured to:
transmit the received recognition result to a text to speech (TTS) device included in the first recognition device,
receive voice data corresponding to the recognition result from the first recognition device, and
transmit the received voice data to the electronic device.

9. The intelligent gateway device of claim 1, wherein the processor is further configured to:
convert a protocol of the received data to correspond to a protocol of the first recognition device, and
transmit the converted data to the first recognition device.

10. The intelligent gateway device of claim 1, wherein the electronic device and the control device are different from each other.

11. The intelligent gateway device of claim 1, wherein the user request includes at least one of a control command of the control device and a non-control command for acquiring information.

12. The intelligent gateway device of claim 1, wherein the processor further is configured to:
receive a control result from a target electronic device as a result of performing an operation corresponding to the received recognition result;
select at least one recognition device from the plurality of recognition devices;
transmit the control result to the control device;
acquire a text data corresponding to the control result;
transmit the text data to the TTS device in one of the plurality of recognition devices;

receive a voice data corresponding to the text data from the TTS device; and transmit the voice data to the target electronic device.

13. The intelligent gateway device of claim 1, wherein the controller is further configured to process a plurality of data received from a plurality of electronic devices in parallel.

14. The intelligent gateway device of claim 1, wherein the processor is further configured to perform a user authentication operation based on identification information included in the received data.

15. The intelligent gateway device of claim 1, wherein the master manager is further configured to:

allocate each of a plurality of data received from the electronic devices to any one processor, and request standby by informing the electronic device of an excessive load state when all of the processors are being used.

16. A control system comprising:

an intelligent gateway device including a master manager and a plurality of processors, wherein the master manager is configured to:

receive data including a user request from an electronic device, and allocate the data to any one processor of the plurality of processors, wherein the any one processor is configured to:

receive data from the master manager, acquire characteristic information for the user request from the received data, select at least one recognition device from a plurality of recognition devices based on the acquired characteristic information, transmit the data to a first recognition device of the selected at least one recognition device, and receive a recognition result of the user request from any one recognition device of the at least one recognition device; and a controller configured to:

receive the recognition result from the intelligent gateway device, generate a control command or output data corresponding to the received recognition result, and transmit the generated control command or output data to a second electronic device.

17. The control system of claim 16, wherein the user request has any one of a data type of a voice, a text, or an image, and wherein the characteristic information includes language information of the user request, the data type, and property information showing whether to control an electronic device.

18. The control system of claim 17, wherein the data type of the user request corresponds to a voice, and the intelligent gateway device is further configured to:

select the first recognition device from the plurality of recognition devices, wherein the first recognition device is capable of converting a voice of a language corresponding to the language information into a text, and transmit the data to an automatic speech recognition (ASR) device included in the selected first recognition device.

19. The control system of claim 18, wherein the intelligent gateway device is further configured to:

select the any one recognition device from the plurality of recognition devices, wherein the any one recognition device is capable of recognizing a user request, corresponding to the property information and receive the recognition result from a natural language processing (NLP) device included in the any one recognition device.

20. The control system of claim 19, wherein when the property information corresponds to a request to provide predetermined information, the intelligent gateway device is further configured to:

transmit the received recognition result to text to speech (TTS) device included in the first recognition device, receive voice data corresponding to the recognition result from the first recognition device, and transmit the received voice data to the electronic device.

21. The control system of claim 16, wherein the intelligent gateway device is further configured to:

convert a protocol of the received data to correspond to a protocol of the first recognition device, and transmit the converted data to the first recognition device.

22. The control system of claim 16, wherein the control device is further configured to:

transmit the control command corresponding to the recognition result to the second electronic device, receive a control result based on the control command from the second electronic device, acquire text data corresponding to the received control result, and transmit the acquired text data to the intelligent gateway device.

23. The control system of claim 22, wherein the intelligent gateway device is further configured to:

transmit the received text data to any one recognition device of the plurality of recognition devices, receive voice data converted from the text data from the any one recognition device, and transmit the received voice data to the electronic device.

24. The control system of claim 16, wherein the plurality of processors is configured to process a plurality of data received from a plurality of electronic devices in parallel.

25. The control system of claim 16, wherein the processor is further configured to perform a user authentication operation based on identification information included in the received data.

* * * * *